H. L. CRUTTENDEN.
DENTAL CEMENT INJECTING TUBE.
APPLICATION FILED APR. 26, 1917.

1,341,736.  Patented June 1, 1920.

Witnesses.
A. H. Opsahl.
Eva E. König.

Inventor.
Henry L. Cruttenden
By his Attorneys
Williamson Merchant

UNITED STATES PATENT OFFICE.

HENRY L. CRUTTENDEN, OF NORTHFIELD, MINNESOTA.

DENTAL-CEMENT-INJECTING TUBE.

1,341,736.          Specification of Letters Patent.          Patented June 1, 1920.

Application filed April 26, 1917. Serial No. 164,650.

*To all whom it may concern:*

Be it known that I, HENRY L. CRUTTENDEN, a citizen of the United States, residing at Northfield, in the county of Rice and State of Minnesota, have invented certain new and useful Improvements in Dental-Cement-Injecting Tubes; and I do hereby declare the following to be a full, clear, and exact description of the invention, such as will enable others skilled in the art to which it appertains to make and use the same.

My present invention relates to dental cement injecting tubes of the general character disclosed and claimed in my prior Patent No. 716,677, of date, December 23rd, 1902, and subsequent Patent No. 749,846, of date, January 19, 1904.

More particularly, the present invention is an improvement on the transparent collapsible tube disclosed and claimed in my said Patent No. 749,846. The said transparent tube has been put on the market in very large quantities and has hitherto been made of gelatin and uncolored, and hence, almost perfectly transparent. In fact, it has been found that these tubes, thus made of untinted or natural gelatin, are so extremely transparent that when laid upon objects of different color are not readily visible because they partake of the color, or rather, the color of the supporting object will be shown through the same so that the tube, itself, does not stand out and must be observed closely.

In the use of these tubes, they are filled with the cement that sets very quickly and hence, requires rapid manipulation, so that no time must be lost in hunting for a tube after the cement has been mixed. To illustrate, the cement, after being mixed, must be inserted into the tube and then injected from the tube into the tooth cavity before it hardens, and the time required for the cement to harden will depend on the thickness and nature thereof, but in practice, will vary only a few seconds to a minute, or less. At any rate, these operations must be so quickly performed that if an instant be lost in picking up the tube, the whole operation may be spoiled.

I have found that the use of these tubes may be very greatly facilitated by making the same of colored or tinted gelatin, but transparent to an extent; at least, so that the amount of cement contained in the tube may be readily observed.

The improved tube is illustrated in the accompanying drawings wherein like characters indicate like parts throughout the several views.

Referring to the drawings.

Figure 1:
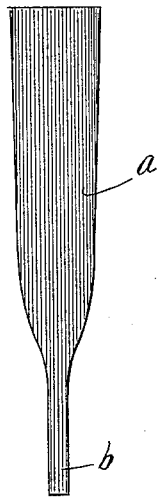
Figure 1 is an elevation of the tube.
Figure 2:
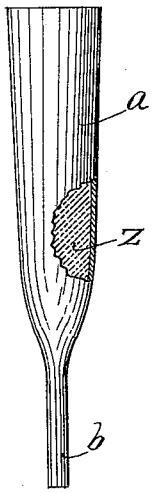
Fig. 2 is an elevation of the tube with some parts broken away, showing cement contained within the same.
Figure 3:
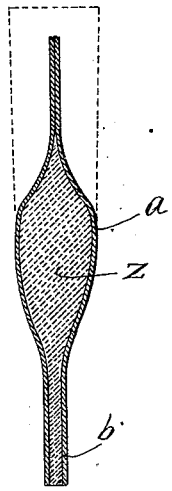
Fig. 3 shows the tube in elevation, partly collapsed, its normal form being indicated by dotted lines.

The character $a$ indicates the body of the collapsible tube, which tube is opened at one end and is formed at its other end with an attenuated or capillary discharge nipple $b$ adapted to be inserted into a tooth cavity, and through which the cement is adapted to be injected into said cavity. In the drawings, the size of the tube is exaggerated. The cement within the tube is indicated by the character Z. The gelatin forming the body of the tube may be made in different colors, but should be given some pronounced color or tint, so that it will be quickly and easily observed when placed upon an object of any color except that of its own color or tint. Preferably, therefore, the tube will be made in red, or some tint not usually found on tables, mats, or other objects on which the tube is liable to be placed.

What I claim is:

A collapsible dental cement injecting tube having a large opening at one end and an attenuated discharge nipple at its other end, said tube being formed and constructed of colored or tinted gelatin and being collapsible, substantially as described.

In testimony whereof I affix my signature in presence of two witnesses.

HENRY L. CRUTTENDEN.

Witnesses:
BERNICE G. WHEELER,
HARRY D. KILGORE.